United States Patent
Monforte, II et al.

(10) Patent No.: US 9,216,523 B2
(45) Date of Patent: Dec. 22, 2015

(54) PROCESS FOR SHAPING OR FORMING ARTICLES

(75) Inventors: Gregory M. Monforte, II, Nicholson, PA (US); David James Burke, Carbondale, PA (US); Matthew Madden, Dickson City, PA (US)

(73) Assignee: GENTEX CORPORATION, Simpson, PA (US)

( * ) Notice: Subject to any disclaimer, the term of this patent is extended or adjusted under 35 U.S.C. 154(b) by 472 days.

(21) Appl. No.: 13/805,748

(22) PCT Filed: Jun. 23, 2011

(86) PCT No.: PCT/US2011/041648
§ 371 (c)(1),
(2), (4) Date: Jan. 11, 2013

(87) PCT Pub. No.: WO2011/163486
PCT Pub. Date: Dec. 29, 2011

(65) Prior Publication Data
US 2013/0106021 A1 May 2, 2013

Related U.S. Application Data

(60) Provisional application No. 61/357,799, filed on Jun. 23, 2010.

(51) Int. Cl.
*B29C 59/02* (2006.01)
*B29C 43/52* (2006.01)
*B29C 70/44* (2006.01)

(52) U.S. Cl.
CPC ............... *B29C 43/52* (2013.01); *B29C 70/44* (2013.01)

(58) Field of Classification Search
CPC .................. Y10T 29/49805; B21D 22/205
USPC ......... 264/320, 319, 299, 324, 241, 250, 255, 264/257, 667, 570
See application file for complete search history.

(56) References Cited

U.S. PATENT DOCUMENTS 5,578,158 A  11/1996  Gutowski et al.
6,631,630 B1  10/2003  Pourboghrat et al.
(Continued)

FOREIGN PATENT DOCUMENTS

| CN | 1744985 A | 3/2006 |
|----|-----------|--------|
| CN | 1822944 A | 8/2006 |
| DE | 19540189 A1 | 4/1997 |
| WO | 02/24370 A2 | 3/2002 |

OTHER PUBLICATIONS

First Office Action for Chinese Patent Application No. 201180040543.0 dated Sep. 23, 2014.
(Continued)

*Primary Examiner* — Stella Yi
(74) *Attorney, Agent, or Firm* — Morgan, Lewis & Bockius LLP

(57) ABSTRACT

The present application discloses a method of shaping a working material (12) into an article, consisting of two primary stages: (a) in the absence of added heat, consolidating and shaping the working material into a pre-form shape using a dynamic hydroforming process that employs a rigid, male-shaped tool (32) and a non-rigid, female-shaped tool (23, 24, 26); and (b) in the presence of added heat, further consolidating and shaping the working material into the final shape using at least one additional rigid forming tool (50).

21 Claims, 8 Drawing Sheets

(56) References Cited

U.S. PATENT DOCUMENTS 7,862,323 B2  1/2011  Micarelli
8,071,008 B1  12/2011  Brachos et al.

OTHER PUBLICATIONS

Kueterman T. P.; Advanced Manufacturing of Thermoplastic Composites; Advanced Composites—Conference Proceedings, American Society for Metals; Dec. 1, 1985; pp. 147-153.

US 9,216,523 B2

PROCESS FOR SHAPING OR FORMING ARTICLES

CROSS REFERENCE TO RELATED APPLICATION(S)

This application is a National Stage filing of International Patent Application No. PCT/US11/41648 filed on Jun. 23, 2011, which claims the benefit of U.S. Provisional Application No. 61/357,799, filed Jun. 23, 2010, which are incorporated herein by reference as if fully set forth.

FIELD OF THE INVENTIVE CONCEPT(S)

The present inventive concept(s) relate to the field of forming or shaping articles, in particular forming or shaping articles using a hydroforming process for at least one of the forming or shaping steps.

BACKGROUND OF THE INVENTIVE CONCEPT(S)

Existing hydroforming processes use high-pressure hydraulic fluid to compress a piece of working material against a stationary die or moving punch to form an article of a particular shape. It is known in the art to use a hydroforming process to shape complex structures from pieces of sheet metal or composite materials, for example continuous-fiber or woven-fiber composites. Due to the even application of hydrostatic pressure supplied by the hydroforming process, it is known to provide the advantage of reducing the presence of wrinkles and folds in the shaped working material.

Formation of a multi-layered continuous-fiber or woven-fiber composite requires a curing step wherein pressure and heat are applied to the layers of composite material in order to compress and fuse together the resin base of the layers of composite material, remove air voids from between the layers, and finally cure or set the layers of composite material together. However, typical fiber materials suitable for ballistic composite sheets, for example polyethylene, are known to degrade when subject to high heat for an extended period of time.

In addition, the known benefits of using a hydroforming process to shape composite structures allows the user to avoid placing relief cuts into the body of the flat layers of composite material prior to the forming process, which is necessary when using other known shaping methods in order to reduce wrinkling of the layers of composite material during the formation process. A drawback to placing relief cuts into the flat layers is that the strength of the layers of composite material, in particular the strength of the reinforcing fibers thereof, is reduced when the composite layers (i.e., the reinforcing fibers) are cut. Thus, it is desirable to avoid cutting into the body of the layers of composite material in order to maximize the strength of these layers. The use of a hydroforming process during the pre-forming stage makes avoidance of cutting into the body of the flat composite layers possible. The prior art also discloses mechanical clamping of the working material within the chamber of the hydroform press prior to the pressurization step in order to prevent wrinkling of the working material during the hydroforming process.

Therefore, it is desirable to have a process for forming or shaping articles which improves the formed shape of the article, while reducing the duration of exposure to heat experienced by the reinforcement fiber materials and avoiding the need to provide relief cuts into the body of the layers of the composite material, all while not significantly impacting the costs associated with production of the final article.

Relevant background references include U.S. Pat. Nos. 5,578,158, 6,631,630, and 7,862,323.

SUMMARY OF THE INVENTIVE CONCEPT(S)

In a first respect, the present application discloses a method of shaping a flat working material into a composite product having a final shape, the method comprising: (a) in the absence of added heat, consolidating and shaping the working material into a pre-form shape using a dynamic hydroforming process that employs a rigid, male-shaped tool and a non-rigid, female-shaped tool; and (b) in the presence of added heat, further consolidating and shaping the working material into the final shape using at least one additional rigid forming tool.

In another respect, the present application discloses a method of shaping a working material into a composite product having a final shape, the working material including a resinous matrix material, the method comprising: (a) consolidating and shaping the working material into a pre-form shape using a deep-draw hydroforming process that employs a rigid, male-shaped tool and a non-rigid, female-shaped tool, the consolidating and shaping occurring below a critical temperature of the resinous matrix material; and (b) further consolidating and shaping the working material into the final shape using at least one additional rigid forming tool, the further consolidating and shaping occurring at or above the critical temperature.

In still another respect, the present application discloses a method of shaping a flat working material into a composite product having a final shape, the method comprising: (a) in the absence of added heat, consolidating and shaping the working material into a pre-form shape using a dynamic hydroforming process that employs a rigid tool and a non-rigid tool; and (b) in the presence of added heat, further consolidating and shaping the working material into the final shape using at least one additional rigid forming tool.

BRIEF DESCRIPTION OF THE DRAWING(S)

The herein disclosed inventive concepts will hereinafter be described in conjunction with the appended drawing figures wherein like numerals denote like elements.

DETAILED DESCRIPTION OF THE PREFERRED EMBODIMENT(S)

Figure 1:
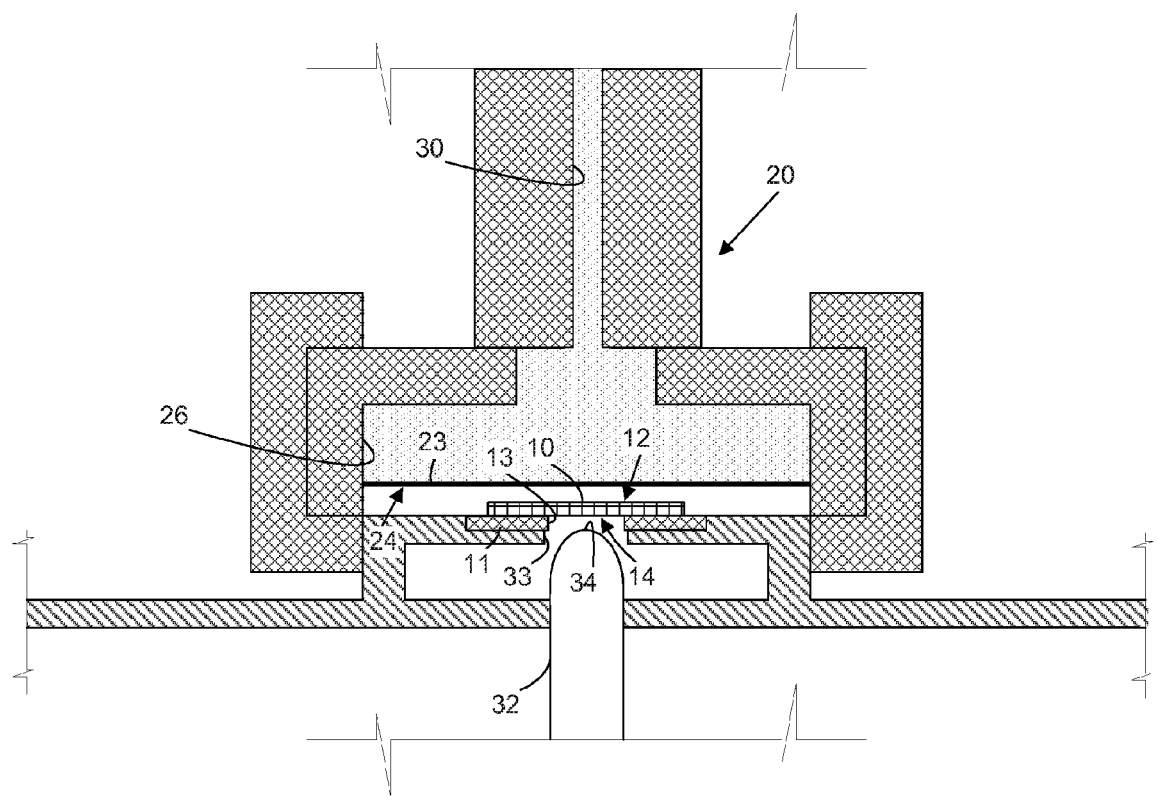
FIG. 1 is a sectional view of an unshaped working material located in a hydroforming machine in an unpressurized state prior to a shaping step of a pre-forming stage.

The ensuing detailed description provides preferred exemplary embodiments only, and is not intended to limit the scope, applicability, or configuration of the herein taught inventive concept(s). Rather, the ensuing detailed description of the preferred exemplary embodiments will provide those skilled in the art with an enabling description for implementing the preferred exemplary embodiments of the inventive concept(s). It should be understood that various changes may be made in the function and arrangement of elements without departing from the spirit and scope of the inventive concept(s), as set forth in the appended claims.

To aid in describing the inventive concept(s), directional terms may be used in the specification and claims to describe portions of the present inventive concept(s) (e.g., upper, lower, left, right, etc.). These directional definitions are merely intended to assist in describing and claiming the inventive concept(s) and are not intended to limit the inventive concept(s) in any way. In addition, reference numerals that are introduced in the specification in association with a drawing figure may be repeated in one or more subsequent figures without additional description in the specification in order to provide context for other features.

In this application, "pre-forming" is defined as shaping of a piece of working material to approximate a desired finished shape of an article.

In this application, "working material" is defined as one or more layers of material from which an article of manufacture is formed, for example a composite material. The composite material is preferably prepreg sheets, as further discussed below. The working material may be flat, or of any other initial shape, for purposes of the present disclosure.

The present application discloses a process for forming or shaping composite articles comprising two primary stages: (1) a first stage comprising pre-forming a piece of working material by applying pressure in the absence of added heat to approximate a desired finished shape of an article (i.e., a "pre-form shape"); and (2) a second stage comprising the final shaping or forming of the piece of working material into an article of final shape by applying pressure and added heat. Unlike in the prior art, the present process does not require a mechanical clamping device to support the position of the working material within the chamber of the hydroform press during the hydroforming stage. In the present process, a membrane of the hydroform press provides all of the clamping force applied to the working material during the hydroforming stage.

In one embodiment according to the present inventive concept, the desired finished article is a helmet having ballistic qualities for use by, for example, pilots and infantrymen. In this embodiment, the working material may comprise multiple sheets of composite fibers that are pre-impregnated within a matrix material or resin (hereinafter referred to as "pre-preg" sheets).

The matrix of the pre-preg sheets is used to maintain the relative orientation of the fibers within the sheets of pre-preg, provide a foundation for the structural integrity of the pre-preg sheets, and—as further discussed below—bond multiple sheets of pre-preg to each other during a curing process. In some embodiments according to the present inventive concept(s), the pre-preg sheets may have a flat initial shape.

In some embodiments according to the present inventive concept(s), the composite fibers of the pre-preg sheets may be comprised of ultra high molecular weight polyethylene ("UHMWPE"). Notable commercial examples of UHMWPE include SPECTRA® made by Honeywell International Inc., and DYNEEMA® made by Royal DSM N.V., both of which are sold in the form of pre-preg sheets having uni-directional fiber orientations ("UD pre-preg").

In alternate embodiments, the working material could comprise a metallic material, an aramid material, a carbon material, a plastic-based composite material (which may be UD pre-preg), or any combinations thereof. In some embodiments, the working material could comprise a fibrous material (e.g., pre-preg, aramid) and a non-fibrous material (e.g., carbon, metal). In additional alternate embodiments, the working material could comprise at least one pre-preg sheet, at least one layer of an aramid-based composite material, and at least one layer of a carbon-based composite material which are configured as a "stack-up" or "lay-up" having the pre-preg sheet(s) at the core, the at least one layer of aramid-based composite material located on one or both sides of the pre-preg sheet(s), and the at least one layer of carbon-based composite material forming the outermost layer(s) of the stack-up. In an exemplary embodiment, the at least one layer of aramid-based composite material comprises first and second aramid-based composite layers and the at least one layer of carbon-based composite material comprises first and second carbon-based composite layers, and the working material is arranged into a stacked configuration having the following order from a top layer of the stacked configuration to a bottom layer of the stacked configuration: the first carbon-based composite layer; the first aramid-based composite layer; the at least one prepreg sheet; the second aramid-based composite layer; and the second carbon-based composite layer.

In further alternate embodiments, the working material may comprise a first uni-directional prepreg layer having a first fiber orientation and a second uni-directional prepreg layer having a second fiber orientation, wherein the first and second fiber orientations are orthogonal (i.e., arranged at 90 degrees to each other).

One notable challenge associated with shaping or forming articles from sheets of pre-preg is to translate the performance characteristics of the working material to the desired final article while minimizing degradation in the performance characteristics of the working material as much as possible. Further, it is desirable to achieve this goal while not significantly increasing the costs associated with production of the final article.

When a hydroform press is not used to pre-form a composite material, or if the pre-forming stage is omitted, it may be necessary to place relief cuts into the bodies of the flat layers of composite material prior to the forming process so as to reduce wrinkling of the layers of composite material during the pre-forming process. One drawback to placing these relief cuts into the bodies of the flat layers of composite material is that the strength of the layers of composite material, in particular the strength of the reinforcing fibers thereof, is reduced when the reinforcing fibers of each layer are trimmed. The reinforcing fibers of the layers of composite material maintain their maximum integrity when they are maintained at their full, uncut length. Thus, it is desirable to avoid making relief cuts into the layers of composite material in order to maximize the strength of these layers. The use of a hydroform press in the pre-forming stage makes it unnecessary to place these relief cuts in the layers of composite material.

In accordance with the present inventive concept(s), prior to the pre-forming stage, it may be desirable to pre-trim the flat layers of composite material into an appropriate planar shape that corresponds with the non-planar shape of the desired pre-formed article. For example, if the desired pre-formed article has an approximately hemi-spherical shape, then the flat layers of composite material may be pre-trimmed into circular shapes prior to the pre-forming process. Similarly, if the desired pre-formed article has an ovoid shape, then the flat layers of composite material may be cut into the corresponding oval shape prior to the pre-forming process. It should be made clear, as noted in the previous paragraph, that in some embodiments no cuts are required to be made into the body of the flat layers of composite material. In other words, in some embodiments, no cuts are made into the perimeter of the pre-trimmed shape of the flat layers of composite material. In alternate embodiments, cuts may be made into the body of the flat layers of composite material, for example where it is desirable to reduce the quantity of waste materials produced as a result of the pre-forming process.

Figure 4:
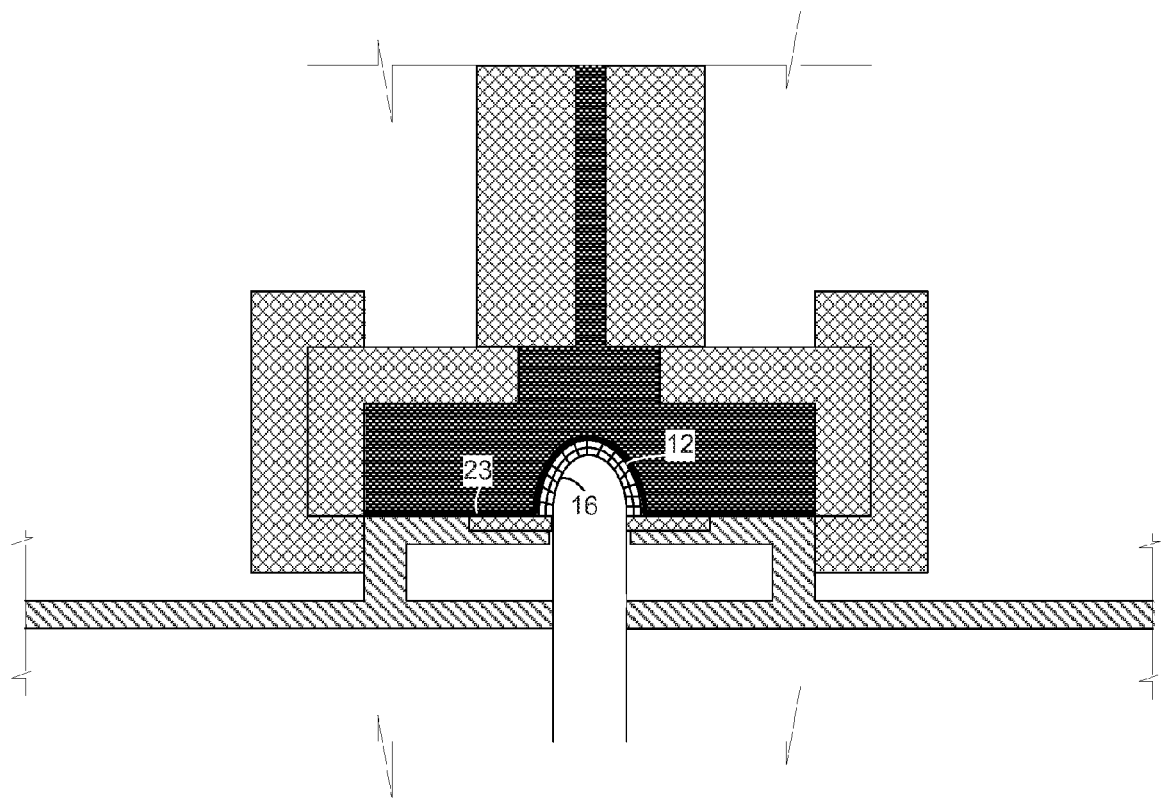
FIG. 4 is a sectional view of the hydroforming machine of FIG. 1 in a pressurized state following the shaping step of the pre-forming stage.
Figure 5:
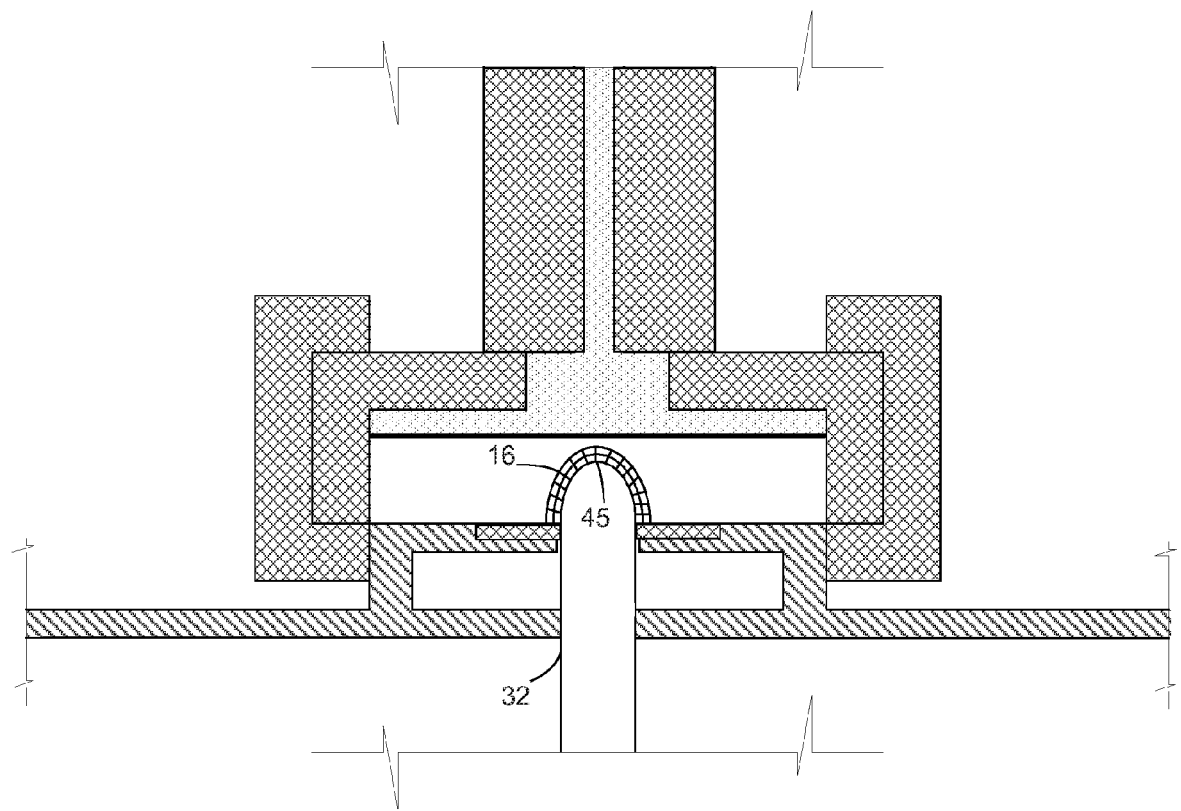
FIG. 5 is a sectional view of the hydroforming machine of FIG. 1 in an unpressurized state following the shaping step of the pre-forming stage.
Figure 6:
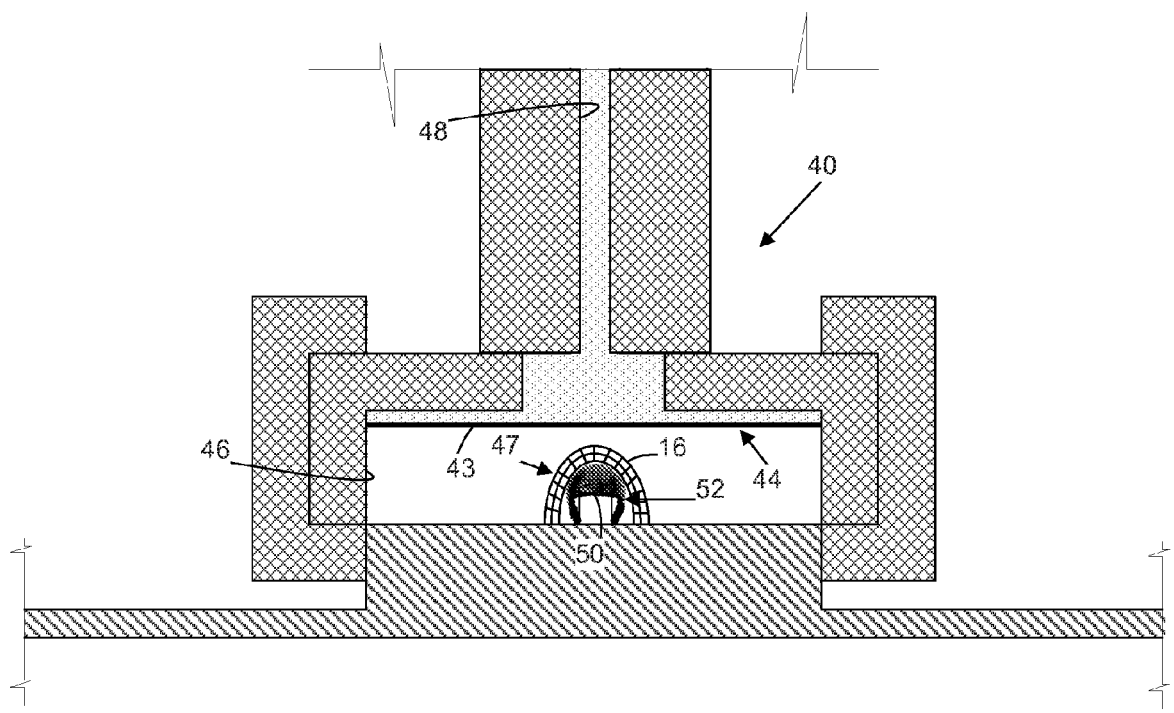
FIG. 6 is a sectional view of the pre-formed working material located in a finishing machine in an unpressurized state prior to the final-forming stage of the working material.
Figure 7:
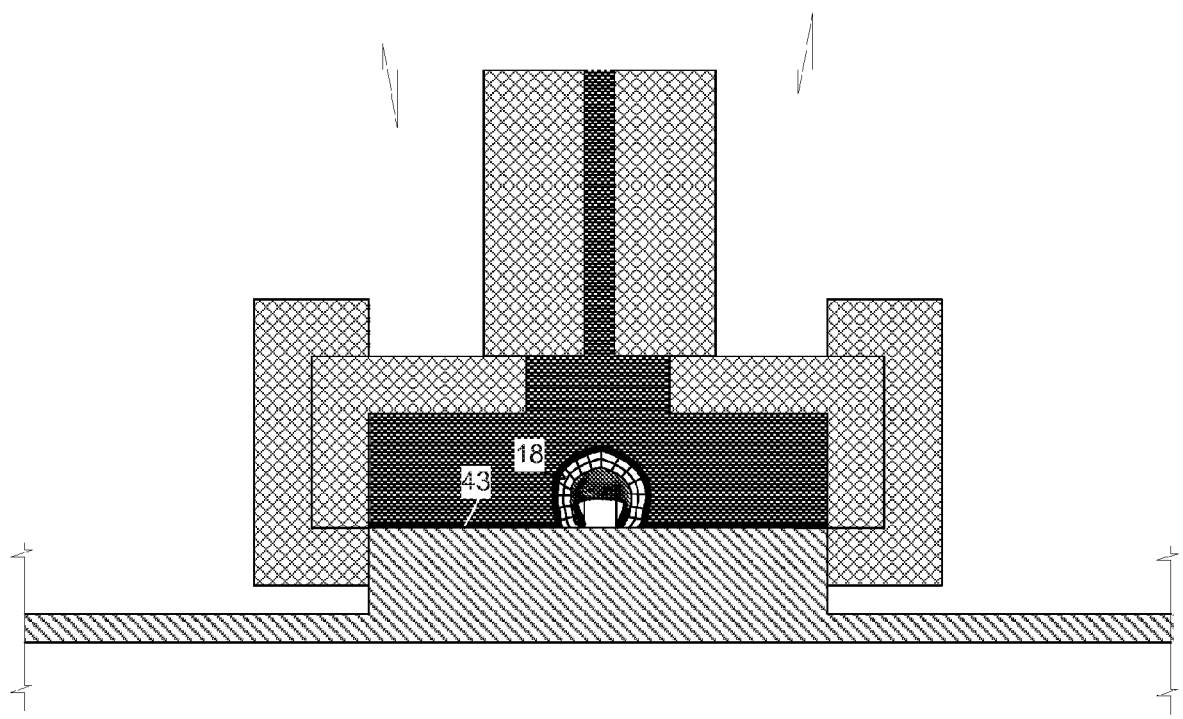
FIG. 7 is a sectional view of the finishing machine of FIG. 6 in a pressurized state during the shaping step of the final-forming stage.
Figure 8:
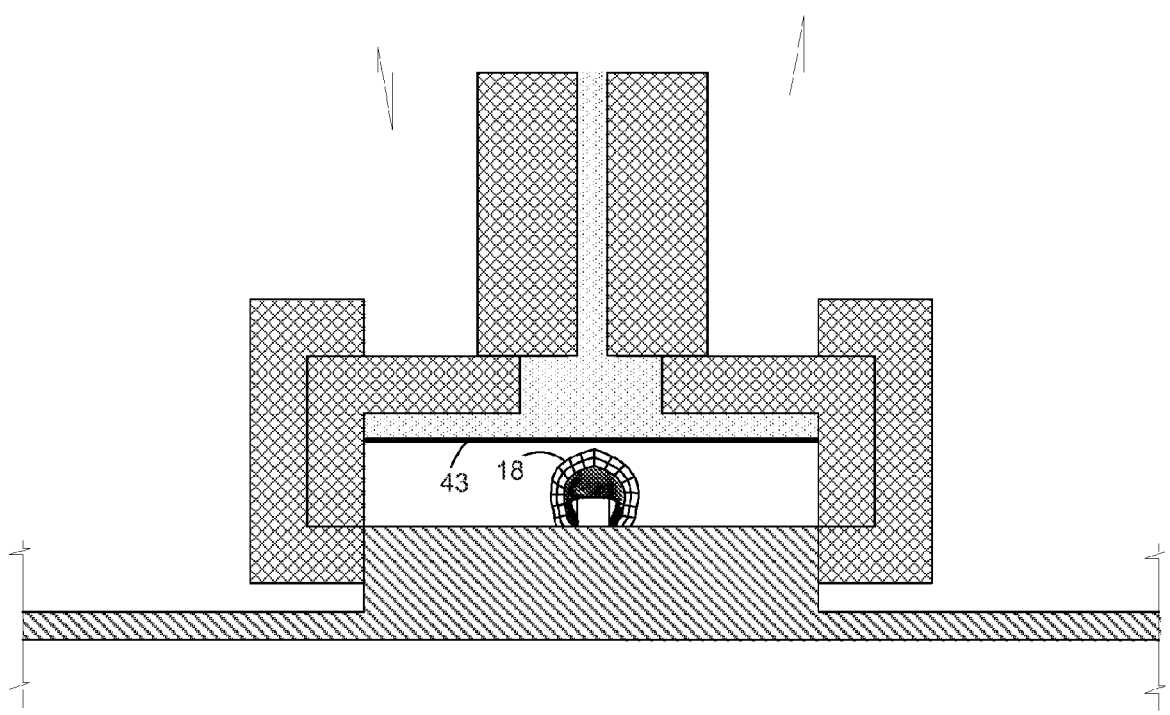
FIG. 8 is a sectional view of the finishing machine of FIG. 6 in an unpressurized state following the shaping step of the final-forming stage.

Referring now generally to FIGS. 1-8, an exemplary method for forming an article will hereinafter be described. FIGS. 1-5 depict steps according to the first, i.e., pre-forming stage of the method, and FIGS. 6-8 depict steps according to the second, i.e., final-forming stage of the method.

FIG. 1 depicts a sectional view of a piece of working material 10 located in a hydroforming machine 20 prior to the shaping step of the pre-forming stage. In this embodiment, the working material 10 comprises one or more flat sheets. At this step, a chamber 26 of the machine 20 is in an unpressurized state, i.e., at approximately normal atmospheric pressure. Along its bottom end the chamber 26 includes a membrane 23. At this step, the chamber 26 is unpressurized such that the membrane 23 is not in contact with the working material 10. A known hydroform press, for example, a TRI-FORM™-brand press made by Pryer Technology Group of Tulsa, Okla., USA, could be employed for the pre-forming stage. At the bottom end of the chamber 26 is a punch opening 33, which is overlaid by a draw ring 11 having an opening 13 in the center thereof. The opening 13 of the draw ring 11 is shaped so as to correspond with the shape of a top end 34 of the punch 32, and is smaller than the punch opening 33. The opening 13 of the draw ring 11 is carefully sized so as to be just barely larger than the dimensions of the punch 32, which is further discussed below. For example, the difference in the widths of the opening 13 and the punch 32 may be on the order of 0.0100-0.0400 inches (0.0254-0.102 centimeters). The tight fit between the punch 32 and the opening 13 of the draw ring 11 prevents the working material 10 from being pushed down into the punch opening 33 when the chamber 26 is pressurized, provided that the punch 32 has previously been placed in a position to sufficiently fill and form a pressure seal within the punch opening 33. It should be understood that the draw ring 11 and punch 32 combination may be changeable so as to create pre-formed articles of different shapes and sizes.

Figure 2:
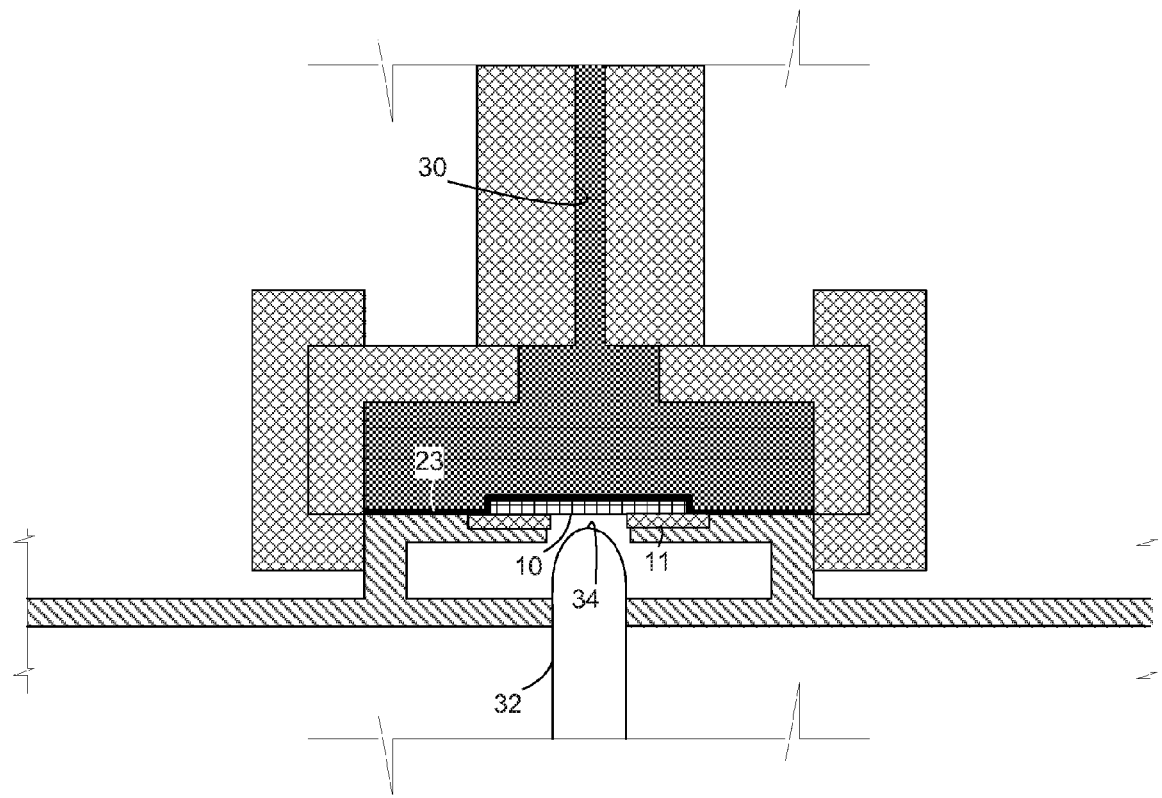
FIG. 2 is a sectional view of the hydroforming machine of FIG. 1 in a pressurized state prior to the shaping step of the pre-forming stage.

FIG. 2 depicts a sectional view of the machine 20 after the chamber 26 has been partially pressurized via the addition of hydraulic fluid to the chamber 26 via fluid conduit 30. The hydraulic fluid may, for example, be an oil, though other known hydraulic fluids are also suitable. During the pre-forming stage, the chamber 26 may, for example, be initially pressurized to an amount between 250-500 p.s.i. ($1.72*10^6$-$3.45*10^6$ Pascals), though higher or lower quantities of initial pressure could also be applied. As a result of pressurization of the chamber 26, the outer surface 24 of the membrane 23 comes in contact with and supplies pressure to the entire interior surface 12 of the working material 10. As noted below, in some embodiments, the pressure in the chamber 26 could be gradually increased as the working material 10 is shaped via a punch 32 of the machine 20.

Figure 3:
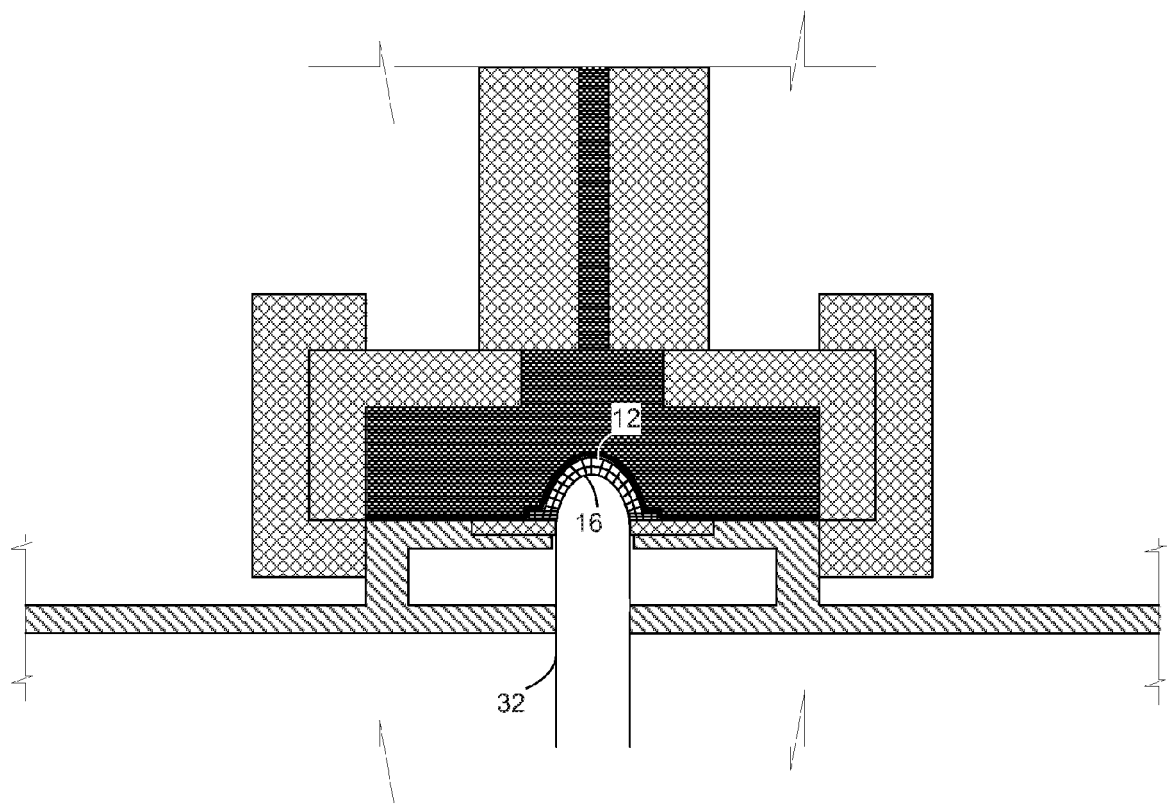
FIG. 3 is a sectional view of the hydroforming machine of FIG. 1 in a pressurized state during the shaping step of the pre-forming stage.

FIGS. 3 and 4 depict sectional views of the machine 20 during and after the shaping step of the pre-forming stage, respectively. During the shaping step, a hydraulically-driven punch 32 of the machine 20 is pressed upwardly against the exterior surface 14 of the working material 10. The punch 32 thus serves as a rigid, male shaping tool. In this embodiment, a top end 34 of the punch 32 is provided in a shape that approximates the shape of the final shape of the article to be formed, i.e., a helmet. The shape of the top end 34 of the punch 32 may, but does not necessarily, represent the exact shape of the desired finished article. As the punch 32 is moved upwardly against the exterior surface 14 of the working material 10 and into the chamber 26, the hydrostatic pressure supplied by the membrane 23 to the interior surface 12 of the working material 10 is gradually increased, for example to a maximum pressure of between 1,000-15,000 p.s.i. ($6.89*10^6$-$1.03*10^8$ Pascals), and thus shapes the working material 10 into a pre-formed article 16, as shown in FIG. 4. The membrane 23 thus serves as a non-rigid, female shaping tool. In this embodiment, the pressing step of the pre-forming stage is performed in the absence of added heat. As noted above, where the working material 10 comprises reinforced polyethylene fibers such as UHMWPE, the absence of added heat during the pre-forming stage protects the fibers from heat exposure and resulting damage during this stage.

In some embodiments (not shown), it may be desirable to lubricate the top end 34 of the punch 32 so that movement of the punch 32 against the working material 10 is aided. In some embodiments, it may not be desirable to permit the lubricant to come in direct contact with the exterior surface 14 of the working material 10, for example where it is not desirable for the lubricant to be absorbed by the working material 10. In these embodiments, a barrier may be placed between the top end 34 of the punch 32 and the exterior surface 14 of the working material 10. The barrier thus prevents the lubricant from coming in contact with the working material. In alternate embodiments, the lubricant and/or barrier may be omitted entirely. In further alternate embodiments, the barrier itself may serve as a lubricant, for example where the barrier is made of a high-elongation plastic material or other suitable material.

The pre-forming process may be performed in a series of "stepped" dynamic shaping stages, each dynamic shaping stage characterized by a deepening position of the punch 32 and a concurrent, increasing amount of pressure generated in the chamber 26. In other words, "dynamic hydroforming" for purposes of this application involves a punch within the chamber of the hydroform press that moves (i.e., does not remain static) in order to shape the desired article. In some embodiments according to the present inventive concept(s), some or all of the shaping stages may be separated by a static "dwell" shaping stage during which the position of the punch 32 does not move and the pressure in the chamber 26 is maintained at a constant value. The static "dwell" shaping stages serve to evacuate air from the chamber 26, thereby preventing dieseling of the air—i.e., combustion in the absence of a spark—from occurring in the chamber 26 and preventing damage to the working material 10 or machine 20 from occurring. The dwell periods may also serve to further consolidate together the layers of working material 10 and evacuate air from between these layers.

In the embodiment shown in FIGS. 1-5, the punch 32 has capabilities to perform punching of either "deep-draw" (e.g., to a depth of approximately 10 inches/25.4 centimeters) or "regular-draw" (e.g., to a depth of approximately 7 inches/

17.8 centimeters). In this embodiment, the deep-draw capability is used, though it should be understood that the regular draw capability could alternatively be used. In alternate embodiments (not shown), the hydroforming machine in the pre-forming stage could be provided without a moving punch, and instead could comprise a stationary male or female die in the shape (or reciprocal shape) of the desired pre-formed article. This process of using a stationary die may be referred to as static hydroforming, as opposed to the process of dynamic hydroforming as discussed above with reference to the embodiment of FIGS. 1-5. In either the male or female static hydroforming alternate embodiments, the membrane of the pressurized chamber would act to press the working material against the die and shape the working material into the desired pre-form shape. In further alternate embodiments, a combination of static and dynamic hydroforming steps could be employed. For example, a punch may be initially positioned slightly within a chamber of a hydroform press such that it serves the role of a stationary die, thereby aiding to partially form the article when the chamber of the machine is pressurized (i.e., the static step). Later, the punch could be moved as additional shaping of the article (and, optionally, changes in the pressurization of the chamber) occurs (i.e., the dynamic step). In still further alternate embodiments, a membrane-less hydroform press could be used in place of a hydroform press having a membrane, in which embodiments the hydraulic material would come in direct contact with the working material, unless the working material is enclosed within a barrier as discussed above.

Hydroforming is advantageous over traditional matched-metal molding (stamping) or drawing of working materials in that hydroforming provides greater dimensional stability, reduces wrinkling of the working materials, and reduces tooling and manufacturing costs. Deep-draw hydroforming is especially efficient at reducing wrinkling of the working materials as they are shaped. Hydroforming also eliminates the shear forces experienced during the stamping process as metal parts are moved past each other. Hydroforming achieves these desirable results by applying normal, isostatic pressure to all points along the surface of the working material that are interior to the chamber of the hydroforming machine.

FIG. 5 depicts a sectional view of the machine 20 after the shaping step of the pre-forming stage has been performed. During this step, the chamber 26 has been depressurized via removal of hydraulic fluid therefrom through the fluid conduit 30. As a result, the membrane 23 has shifted upwardly and is no longer in contact with the outer surface of the pre-formed article 16. In this embodiment, the pre-forming stage is thereafter concluded by retracting the punch 32 back to its original position (as shown in FIGS. 1 and 2), and removing the pre-formed article 16 from the machine 20.

At the second stage of the method according to the present inventive concept(s), the pre-formed article 16 is moved into a finishing machine where it is further consolidated and shaped into a final article and the resinous components of the working material are finally shaped or cured by applying pressure and added heat. The final-forming stage of the process can be performed using a variety of finishing machines, for example an autoclave, hydroclave, hydroform press, or matched-metal tooling.

If the pre-formed article 16 comprises multiple layers of UD pre-preg, for example, it is desirable to further consolidate these layers to remove any remaining air voids and bind or cure the matrices of the adjacent UD pre-preg layers together to form the finished article. Pressure and heat are therefore applied to the pre-formed article 16 in the final-forming stage in order to consolidate and shape the pre-formed article 16 into its final shape and, if necessary, cure the matrix material.

In the embodiment shown in FIGS. 6-8, a static hydroform press is used as the finishing machine 40. As shown in FIG. 6, the pre-formed article 16 is placed in a chamber 46 of the finishing machine 40 around a male die 50. The male die 50 is provided in the desired shape of the fully formed article, which in this embodiment is a helmet. As discussed below, when the chamber 46 is pressurized, a membrane 43 located in the chamber 46 comes in contact with and applies pressure to the pre-formed article 16. As a result, the pre-formed article is pressed against an outer surface 52 of the male die 50, thereby shaping the pre-formed article 16 into a finished article 18. In alternate embodiments, the male die 50 could be replaced by a female die or cutout in the approximate shape of the desired article. In those embodiments, the membrane 43 would act as the male component that presses the pre-formed article 16 into the desired shape against the female die or cutout. This process may be referred to as bag molding or bag pressure molding.

FIG. 6 depicts a sectional view of the pre-formed article 16 located in the finishing machine 40 prior to the final shaping step of the final-forming stage. At this step, the chamber 46 of the machine 40 is in an unpressurized state, i.e., at approximately normal atmospheric pressure. At this step, the membrane 43 is not in contact with the pre-formed article 16. A suitable, known hydroform press could be employed for the final-forming stage. It is also possible that the same hydroform press could be used in both the pre-forming stage and the final-forming stage, within the scope of the herein disclosed inventive concept(s).

FIG. 7 depicts a sectional view of the machine 40 after the chamber 46 has been pressurized via the addition of hydraulic fluid to the chamber 46 through fluid conduit 48. The chamber 46 may, for example, be partially pressurized to a pressure of between 2,500-5,000 p.s.i. ($1.72*10^7$-$3.45*10^7$ Pascals) though higher or lower quantities of pressure could be applied, depending on, for example, the characteristics of the materials used. A "stepped" pressurizing process, wherein the pressure in the chamber 46 is gradually increased (either with or without intermittent "dwell" steps) may also be employed at the final-forming stage. Referring back to the embodiment of FIG. 7, at this time, the fluid in the chamber 46 and/or the die 50 is also heated, as necessary, to achieve a critical temperature for final shaping or curing of the matrix material of the UD pre-preg layers. Where the matrix material is a thermoplastic, for example, the critical temperature may be the melting temperature of the particular thermoplastic. In these (e.g., thermoplastic) embodiments, the fluid in the chamber 46 and/or the die 50 may be heated to at or above the melting temperature of the particular thermoplastic so that it transitions to a liquid state in which the matrix material flows and fills the voids between the reinforcing fibers of the pre-preg layers. Where a thermoplastic is used, an additional curing step for the plastic material may or may not be necessary. In alternate embodiments, for example where the matrix material is a thermoset, the critical temperature may be the curing temperature for the selected thermoset resin. In these embodiments, the fluid in the chamber 46 and/or the die 50 may be heated to a temperature sufficient to cure the matrix material into the desired solid shape. It will be readily understood by those having ordinary skill in the art that the appropriate heating (i.e., critical) temperature and heat-exposure time are dependent on the materials used in the pre-preg layers.

Referring back to FIG. 7, as a result of pressurization of the chamber 46 of the machine 40, the outer surface 44 of the membrane 43 supplies pressure to the outer surface 47 of the pre-formed article 16. As the membrane 43 supplies pressure to the outer surface 47 of the pre-formed article 16, the inner surface 45 of the pre-formed article 16 presses against the male die 50. The male die 50 thus determines the shape taken on by the pre-formed article 16 as the membrane 43 is pressed against the outer surface 47 of the pre-formed article 16.

FIG. 8 depicts a sectional view of the machine 40 after the shaping step of the final-forming stage has been performed. During this step, the chamber 46 has been depressurized via removal of hydraulic fluid therefrom through the fluid conduit 48. As a result, the membrane 43 has moved upwardly and is no longer in contact with the outer surface 47 of the pre-formed article 16, which has now been fully shaped into a finished article 18. In this embodiment, the final-forming stage is thereupon concluded. The finished article 18 can then be removed from the machine 40.

While the principles of the herein taught inventive concept(s) have been described above in connection with preferred embodiments, it is to be clearly understood that this description is made only by way of example and not as a limitation of the scope of the inventive concept(s).

Additional Aspects Of The Inventive Concept(S)

Further aspects of the present inventive concept(s) include:

Aspect 1: A method of shaping a flat working material into a composite product having a final shape, the method comprising: (a) in the absence of added heat, consolidating and shaping the working material into a pre-form shape using a dynamic hydroforming process that employs a rigid, male-shaped tool and a non-rigid, female-shaped tool; and (b) in the presence of added heat, further consolidating and shaping the working material into the final shape using at least one additional rigid forming tool.

Aspect 2: The method of Aspect 1, wherein step (a) comprises a series of dynamic shaping stages, each dynamic shaping stage including deepening the position of the rigid, male-shaped tool relative to a first surface of the working material and applying pressure to a second surface of the working material.

Aspect 3: The method of Aspect 2, wherein each dynamic shaping stage includes applying increased pressure to the second surface of the working material.

Aspect 4: The method of any one of Aspects 1-3, wherein the non-rigid, female-shaped tool provides all of the clamping force applied to the working material during step (a).

Aspect 5: The method of any one of Aspects 1-3, wherein step (a) does not employ a mechanical clamping device.

Aspect 6: The method of any one of Aspects 1-5, wherein a draw ring is placed between the rigid, male-shaped tool and the working material prior to step (a).

Aspect 7: The method of any one of Aspects 1-6, wherein step (a) occurs in a first forming machine and step (b) occurs in a second forming machine.

Aspect 8: The method of Aspect 7, wherein the second forming machine is a hydroform press.

Aspect 9: The method of any one of Aspects 1-8, wherein the at least one additional rigid forming tool is male-shaped.

Aspect 10: The method of any one of Aspects 1-9, wherein the at least one additional rigid forming tool does not move during step (b).

Aspect 11: The method of any one of Aspects 1-8 or Aspect 10, wherein the at least one additional rigid forming tool is female-shaped.

Aspect 12: The method of any one of Aspects 1-8, wherein the at least one additional rigid forming tool comprises a pair of matched metal molds.

Aspect 13: The method of any one of Aspects 1-12, wherein the working material comprises a fibrous material and a non-fibrous material.

Aspect 14: The method of any one of Aspects 1-13, wherein the working material comprises at least one prepreg sheet, the at least one prepreg sheet comprising a plurality of composite fibers.

Aspect 15: The method of Aspect 14, wherein the plurality of composite fibers are comprised of ultra high molecular weight polyethylene.

Aspect 16: The method of any one of Aspects 13-15, wherein the working material further comprises at least one layer of aramid-based composite material and at least one layer of carbon-based composite material.

Aspect 17: The method of Aspect 16, wherein the at least one layer of aramid-based composite material comprises first and second aramid-based composite layers and the at least one layer of carbon-based composite material comprises first and second carbon-based composite layers, and the working material is arranged into a stacked configuration having the following order from a top layer of the stacked configuration to a bottom layer of the stacked configuration: the first carbon-based composite layer; the first aramid-based composite layer; the at least one prepreg sheet; the second aramid-based composite layer; and the second carbon-based composite layer.

Aspect 18: The method of any one of Aspects 1-17, wherein the working material comprises a first uni-directional prepreg layer having a first fiber orientation and a second uni-directional prepreg layer having a second fiber orientation, wherein the first and second fiber orientations are orthogonal to each other.

Aspect 19: The method of any one of Aspects 1-18, wherein a maximum pressure applied during step (a) is at least double a maximum pressure applied during step (b).

Aspect 20: A method of shaping a working material into a composite product having a final shape, the working material including a resinous matrix material, the method comprising: (a) consolidating and shaping the working material into a pre-form shape using a deep-draw hydroforming process that employs a rigid, male-shaped tool and a non-rigid, female-shaped tool, the consolidating and shaping occurring below a critical temperature of the resinous matrix material; and (b) further consolidating and shaping the working material into the final shape using at least one additional rigid forming tool, the further consolidating and shaping occurring at or above the critical temperature.

Aspect 21: The method of Aspect 20, wherein step (a) occurs in the absence of added heat.

Aspect 22: A method of shaping a flat working material into a composite product having a final shape, the method comprising: (a) in the absence of added heat, consolidating and shaping the working material into a pre-form shape using a dynamic hydroforming process that employs a rigid tool and a non-rigid tool; and (b) in the presence of added heat, further consolidating and shaping the working material into the final shape using at least one additional rigid forming tool.

The invention claimed is:

1. A method of shaping a flat working material into a composite product having a final shape, the method comprising:

(a) in the absence of added heat, consolidating and shaping the working material into a pre-form shape using a dynamic hydroforming process that employs a rigid, male-shaped tool and a non-rigid, female-shaped tool; and (b) in the presence of added heat, further consolidating and shaping the working material into the final shape using at least one additional rigid forming tool, wherein step (a) comprises a series of dynamic shaping stages, each dynamic shaping stage including deepening the position of the rigid, male-shaped tool relative to a first surface of the working material and applying pressure to a second surface of the working material.

2. The method of claim 1, wherein each dynamic shaping stage includes applying increased pressure to the second surface of the working material.

3. The method of claim 1, wherein the non-rigid, female-shaped tool provides all of a clamping force applied to the working material during step (a).

4. The method of claim 1, wherein step (a) does not employ a mechanical clamping device.

5. A method of shaping a flat working material into a composite product having a final shape, the method comprising:

(a) in the absence of added heat, consolidating and shaping the working material into a pre-form shape using a dynamic hydroforming process that employs a rigid, male-shaped tool and a non-rigid, female-shaped tool; and (b) in the presence of added heat, further consolidating and shaping the working material into the final shape using at least one additional rigid forming tool, wherein a draw ring is placed between the rigid, male-shaped tool and the working material prior to step (a).

6. A method of shaping a flat working material into a composite product having a final shape, the method comprising:

(a) in the absence of added heat, consolidating and shaping the working material into a pre-form shape using a dynamic hydroforming process that employs a rigid, male-shaped tool and a non-rigid, female-shaped tool; and (b) in the presence of added heat, further consolidating and shaping the working material into the final shape using at least one additional rigid forming tool, wherein step (a) occurs in a first forming machine and step (b) occurs in a second forming machine.

7. The method of claim 6, wherein the second forming machine is a hydroform press.

8. The method of claim 1, wherein the at least one additional rigid forming tool is male-shaped.

9. A method of shaping a flat working material into a composite product having a final shape, the method comprising:

(a) in the absence of added heat, consolidating and shaping the working material into a pre-form shape using a dynamic hydroforming process that employs a rigid, male-shaped tool and a non-rigid, female-shaped tool; and (b) in the presence of added heat, further consolidating and shaping the working material into the final shape using at least one additional rigid forming tool, wherein the at least one additional rigid forming tool does not move during step (b).

10. The method of claim 9, wherein the at least one additional rigid forming tool is female-shaped.

11. A method of shaping a flat working material into a composite product having a final shape, the method comprising:

(a) in the absence of added heat, consolidating and shaping the working material into a pre-form shape using a dynamic hydroforming process that employs a rigid, male-shaped tool and a non-rigid, female-shaped tool; and (b) in the presence of added heat, further consolidating and shaping the working material into the final shape using at least one additional rigid forming tool, wherein the at least one additional rigid forming tool comprises a pair of matched metal molds.

12. The method of claim 1, wherein the working material comprises a fibrous material and a non-fibrous material.

13. The method of claim 1, wherein the working material comprises at least one prepreg sheet, the at least one prepreg sheet comprising a plurality of composite fibers.

14. The method of claim 13, wherein the plurality of composite fibers are comprised of ultra high molecular weight polyethylene.

15. A method of shaping a flat working material into a composite product having a final shape, the method comprising:

(a) in the absence of added heat, consolidating and shaping the working material into a pre-form shape using a dynamic hydroforming process that employs a rigid, male-shaped tool and a non-rigid, female-shaped tool; and (b) in the presence of added heat, further consolidating and shaping the working material into the final shape using at least one additional rigid forming tool, wherein the working material comprises at least one prepreg sheet, the at least one prepreg sheet comprising a plurality of composite fibers, and the working material further comprises at least one layer of aramid-based composite material and at least one layer of carbon-based composite material.

16. The method of claim 15, wherein the at least one layer of aramid-based composite material comprises first and second aramid-based composite layers and the at least one layer of carbon-based composite material comprises first and second carbon-based composite layers, and the working material is arranged into a stacked configuration having the following order from a top layer of the stacked configuration to a bottom layer of the stacked configuration: the first carbon-based composite layer; the first aramid-based composite layer; the at least one prepreg sheet; the second aramid-based composite layer; and the second carbon-based composite layer.

17. A method of shaping a flat working material into a composite product having a final shape, the method comprising:

(a) in the absence of added heat, consolidating and shaping the working material into a pre-form shape using a dynamic hydroforming process that employs a rigid, male-shaped tool and a non-rigid, female-shaped tool; and (b) in the presence of added heat, further consolidating and shaping the working material into the final shape using at least one additional rigid forming tool, wherein the working material comprises a first uni-directional prepreg layer having a first fiber orientation and a second uni-directional prepreg layer having a second fiber orientation, wherein the first and second fiber orientations are orthogonal to each other.

18. A method of shaping a flat working material into a composite product having a final shape, the method comprising:

(a) in the absence of added heat, consolidating and shaping the working material into a pre-form shape using a dynamic hydroforming process that employs a rigid, male-shaped tool and a non-rigid, female-shaped tool; and (b) in the presence of added heat, further consolidating and shaping the working material into the final shape using at least one additional rigid forming tool, wherein a maximum pressure applied during step (a) is at least double a maximum pressure applied during step (b).

19. A method of shaping a working material into a composite product having a final shape, the working material including a resinous matrix material, the method comprising:

(a) consolidating and shaping the working material into a pre-form shape using a deep-draw hydroforming process that employs a rigid, male-shaped tool and a non-rigid, female-shaped tool, the consolidating and shaping occurring below a critical temperature of the resinous matrix material; and (b) further consolidating and shaping the working material into the final shape using at least one additional rigid forming tool, the further consolidating and shaping occurring at or above the critical temperature, wherein step (a) comprises a series of dynamic shaping stages, each dynamic shaping stage including deepening the position of the rigid, male-shaped tool relative to a first surface of the working material and applying pressure to a second surface of the working material.

20. The method of claim 19, wherein step (a) occurs in the absence of added heat.

21. A method of shaping a flat working material into a composite product having a final shape, the method comprising:

(a) in the absence of added heat, consolidating and shaping the working material into a pre-form shape using a dynamic hydroforming process that employs a rigid tool and a non-rigid tool; and (b) in the presence of added heat, further consolidating and shaping the working material into the final shape using at least one additional rigid forming tool, wherein step (a) comprises a series of dynamic shaping stages, each dynamic shaping stage including deepening the position of the rigid tool relative to a first surface of the working material and applying pressure to a second surface of the working material.

* * * * *